United States Patent
Yeddula et al.

(10) Patent No.: US 10,742,646 B2
(45) Date of Patent: Aug. 11, 2020

(54) PROVISIONING TRANSFERABLE ACCESS TOKENS

(71) Applicant: Visa International Service Association, San Francisco, CA (US)

(72) Inventors: Prasanth Yeddula, Sunnyvale, CA (US); Ashwini Laxminarayana Tantry, Fremont, CA (US)

(73) Assignee: Visa International Service Association, San Francisco, CA (US)

( * ) Notice: Subject to any disclaimer, the term of this patent is extended or adjusted under 35 U.S.C. 154(b) by 268 days.

(21) Appl. No.: 15/976,327

(22) Filed: May 10, 2018

(65) Prior Publication Data

US 2019/0349360 A1    Nov. 14, 2019

(51) Int. Cl.
*H04L 29/06* (2006.01)
*G06F 16/245* (2019.01)

(52) U.S. Cl.
CPC ........ *H04L 63/0853* (2013.01); *G06F 16/245* (2019.01); *H04L 63/102* (2013.01)

(58) Field of Classification Search
CPC .. H04L 63/0853; H04L 63/102; G06F 16/245
See application file for complete search history.

(56) References Cited

U.S. PATENT DOCUMENTS

| | | | |
|---|---|---|---|
| 5,280,527 A | 1/1994 | Gullman et al. | |
| 5,930,767 A | 7/1999 | Reber et al. | |
| 6,000,832 A | 12/1999 | Franklin et al. | |
| 6,453,301 B1 | 9/2002 | Niwa | |
| 6,898,711 B1 * | 5/2005 | Bauman | G06F 21/31 713/182 |
| 7,010,600 B1 * | 3/2006 | Prasad | H04L 63/0815 709/223 |
| 7,657,745 B2 * | 2/2010 | Morris | G06Q 20/382 380/278 |
| 7,770,212 B2 * | 8/2010 | Le Saint | G06F 21/445 713/193 |

(Continued)

FOREIGN PATENT DOCUMENTS

| | | |
|---|---|---|
| EP | 1028401 A2 | 8/2000 |
| WO | 2000/14648 | 3/2000 |

(Continued)

*Primary Examiner* — Sher A Khan
(74) *Attorney, Agent, or Firm* — Kilpatrick Townsend & Stockton LLP

(57) ABSTRACT

Methods and systems for provisioning transferable access tokens are disclosed. An access device associated with a resource provider can communicate with a first communication device as part of an interaction between a first user and the resource provider. The access device can generate an authorization request message comprising a first access token and an interaction value. The access device can transmit the authorization request message to an authorization computer. The authorization computer can authorize the interaction and generate an authorization response message. After authorizing the interaction, the authorization computer can provide a transferable access token to the first communication device. The first communication device can transmit the transferable access token to a second communication device, so that a second user can use the transferable access token in an interaction.

17 Claims, 7 Drawing Sheets

(56) References Cited

U.S. PATENT DOCUMENTS

| | | | |
|---|---|---|---|
| 8,818,462 B2* | 8/2014 | Hicks, III | H04L 63/0853 |
| | | | 455/558 |
| 8,856,539 B2 | 10/2014 | Weiss | |
| 8,972,048 B2* | 3/2015 | Canora | G06Q 20/3278 |
| | | | 700/237 |
| 9,100,826 B2 | 8/2015 | Weiss | |
| 9,456,348 B2* | 9/2016 | Dennis | H04W 12/06 |
| 9,530,137 B2 | 12/2016 | Weiss | |
| 2002/0007351 A1* | 1/2002 | Hillegass | G06Q 20/06 |
| | | | 705/59 |
| 2004/0236632 A1 | 11/2004 | Maritzen et al. | |
| 2007/0198421 A1* | 8/2007 | Muller | G06F 21/10 |
| | | | 705/52 |
| 2008/0212771 A1* | 9/2008 | Hauser | G06F 21/305 |
| | | | 380/44 |
| 2009/0064303 A1* | 3/2009 | Dickinson | G06Q 10/06 |
| | | | 726/10 |
| 2013/0198080 A1 | 8/2013 | Anderson et al. | |
| 2013/0254102 A1 | 9/2013 | Royyuru | |
| 2015/0032627 A1 | 1/2015 | Dill et al. | |
| 2015/0199679 A1 | 7/2015 | Palanisamy et al. | |
| 2016/0224977 A1 | 8/2016 | Sabba et al. | |
| 2017/0244727 A1* | 8/2017 | Thomas | H04L 63/102 |
| 2017/0262842 A1 | 9/2017 | Subbarayan et al. | |
| 2017/0270511 A1 | 9/2017 | Lindeman et al. | |

FOREIGN PATENT DOCUMENTS

| | | | |
|---|---|---|---|
| WO | 2004/051585 A2 | 6/2004 | |
| WO | 2005/001751 A1 | 1/2005 | |

* cited by examiner

US 10,742,646 B2

PROVISIONING TRANSFERABLE ACCESS TOKENS

BACKGROUND

People use computers to control access to resources. An ideal access control system allows access to users with permission and denies access to users without permission. As an example, an ideal medical record database allows a patient and their doctor access to the patient's medical records, and denies access to all other users.

Access control systems commonly perform at least two operations: authentication and authorization. An access control system first authenticates by determining and verifying the identity of a requesting user. The access control system then authorizes the resource access request, allowing the requesting user to access the requested resource.

Credentials are often used by access control systems to authenticate users. A credential (such as a username and password) can be used to both identify a user and verify the user's identity. Usernames and passwords are often used to access resources over the web, such as emails or videos from online streaming services. In commerce, a payment account number (PAN) is used to both authenticate a consumer and authorize a payment between the payment account associated with the PAN and an account associated with a merchant.

Credentials are frequently targeted by thieves because they allow for access to protected resources. Thieves target credentials (such as social security numbers, PANs, driver's license numbers, usernames and passwords, etc.) and use these credentials to impersonate victims, steal from bank accounts, take out loans, defame victims, etc.

Tokenization is a means to protect credentials. A token is a replacement for a credential. Rather than providing a credential to an access control system, a user can provide an access token. The access control system can detokenize the access token, determining the credential that the access token replaces. The access control system can authenticate the user based on the credential and authorize access to the requested resource. A lost or stolen access token can be revoked and replaced, preventing thieves from doing any serious damage.

While tokenization is useful in mitigating theft, conventional access tokens are non-transferable. This property prevents conventional access tokens from being used in a number of useful contexts (e.g., allowing a guest to access an apartment).

In this example, a resident living in an apartment complex may have an access token that they use to access the apartment complex. The access token may be thought of as an analog to a physical key. The access token may be stored on an electronic device, such as a smart card, key fob, or smart phone, and the resident may present the access token to an access control system via the electronic device.

The resident may be expecting a guest and may want to allow the guest access to the apartment complex. However, the resident cannot transfer the access token because it is bound to the resident's electronic device. Even if it were possible to transfer the access token, transferring the access token would effectively give the guest the same level of access as the resident, analogous to giving the guest a copy of a physical key. If at some point the resident does not want the guest to have access to the apartment, the resident needs to have the current access token revoked and have a new access token issued, analogous to changing the resident's lock, which is inconvenient to the resident. This example highlights a problem with conventional access tokens.

Embodiments of the invention solve these and other problems individually and collectively.

SUMMARY

Embodiments of the invention provide for methods and systems for provisioning transferable access tokens. Transferable access tokens can be stored on and transferred between communication devices (e.g., smart phones, wearable devices, internet connected vehicles, etc.) and used by users in interactions with resource providers. An example of an interaction with a resource provider is a transaction with a merchant. In this example, a user operating a communication device can provide a transferable access token to the merchant in order to pay for a good or service provided by the merchant. Another example of an interaction with a resource provider is an attempt by a user to access a building such as an apartment complex. A user can provide a transferable access token to an access control system (such as a computerized gate) in order to gain access to the apartment complex. Transferable access tokens can take the form of alphanumeric sequences, such as "1234 5678 9000 0001."

An access token can be associated with an interaction value. The meaning of an interaction value can depend on the context of the interaction. For a transaction, an interaction value may be a monetary value, such as $100.00. For accessing a building, an interaction value may be five accesses. The interaction value may define the total utility or lifetime of the transferable access token. A transferable access token with interaction value of $100.00 may be used to purchase no more than $100.00 worth of goods or services. A transferable access token with interaction value of five accesses may be used to access a resource no more than five times.

Further, transferable access tokens may be split or combined with other transferable access tokens. As an example, a transferable access token "12345" with an interaction value equal to $100.00 may be split into four transferable access tokens with interaction values $10.00, $20.00, $30.00, and $40.00. In some embodiments, these transferable access tokens can be alphanumeric sequences associated with the original transferable access token, e.g., "12345-1," 12345-2", etc. In other embodiments, these transferable access tokens can be alphanumeric sequences unrelated to the original transferable access token, e.g., "23930," "92348." A first user can distribute these four transferable access tokens to other users such that the other users can use the transferable access tokens in interactions. As another example, one transferable access token with interaction value of "five rides on a rollercoaster" and another transferable access token with interaction value of "three rides on a rollercoaster" can be combined into a single transferable access token with interaction value of "eight rides on a rollercoaster."

Embodiments of the invention provide a number of advantages over conventional access control systems that use conventional access tokens. Transferable access tokens can be used in a number of ways that conventional access tokens cannot. For example, a transferable access token can be used as a gift, enabling one user to transfer an access token such as access to a concert venue. The giving user can simply send the receiving user the transferable access token via their communication devices, for example, via near field communication. Additionally, the ability to split or combine transferable access tokens enables users to exercise more control over how their access tokens can be used. For example, a user may want to allow a maintenance worker to have access to their home so that the maintenance worker can perform repairs. Normally, the user would be at home and let the maintenance worker in, however, the user may be busy with work. The user can transmit a transferable access token with one or two accesses to the maintenance worker, allowing the maintenance worker to enter the home in order to perform repairs, but preventing the maintenance worker from entering at a later time. This is more convenient to the user than the alternatives, such as taking time off from work, giving the maintenance worker a key or an access token with full access. Further, including the transferable access token in an authorization response message, as described below, is a novel method of transmitting an access token that greatly simplifies the provisioning process.

Embodiments of the invention will be introduced here and described in greater detail below. One embodiment is directed to a method comprising: receiving, by an authorization computer and from an access device, an authorization request message comprising an access token and an interaction value in a first interaction between a resource provider operating the access device and a first user that uses a portable device, wherein the access token is a substitute for a real credential; determining, by the authorization computer, that the first interaction is authorized; generating, by the authorization computer, an authorization response message; transmitting, by the authorization computer, the authorization response message to the access device; and providing, by the authorization computer, a first transferable access token associated with the interaction value to a first communication device operated by the first user, wherein the first transferable access token is transferable to a second communication device operated by a second user to allow the second communication device to conduct a second interaction.

Another embodiment is directed to an authorization computer comprising a processor and a non-transitory computer readable medium coupled to the processor, the non-transitory computer readable medium comprising code executable by the processor for implementing the above method.

Another embodiment is directed to a communication device comprising: a processor; and a non-transitory computer readable medium coupled to the processor, the non-transitory computer readable medium comprising code executable by the processor for implementing a method comprising: transmitting, as part of an interaction, an access token to an access device operated by a resource provider, wherein the access device transmits the access token to an authorization computer and wherein the authorization computer determines whether the interaction is authorized and transmits an authorization response message back to the access device; receiving from an authorization computer, a transferable access token; and storing the transferable access token in a secure memory.

Prior to discussing specific embodiments of the invention, some terms may be described in detail.

TERMS

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "secure element" may refer to a component that can perform a function securely. A secure element may be a memory that securely stores data, such that access to the data is protected. An example of a "secure element" is a trusted execution environment (TEE), a secure area of a processor. Another example of a secure element is a universal integrated-circuit card (UICC), a secure smart card. An additional example of a secure element is an embedded secure element, an embedded hardware component in a larger mechanical or electrical system.

A "user" may refer to a person or thing that employs some other thing for some purpose. A user may include an individual that may be associated with one or more personal accounts and/or user devices. The user may also be referred to as a cardholder, account holder, or consumer in some embodiments.

A "resource" may refer to something that may be used by an entity or transferred between entities. Examples of resources include goods, services, information, and/or access to restricted locations.

A "resource provider" may refer to an entity that can provide resources. Examples of resource providers include merchants, governmental agencies, etc. A resource provider may operate a resource provider computer.

An "interaction" may refer to a reciprocal action, effect or influence. For example, an interaction could be an exchange or transaction between two or more parties.

An "interaction value" may refer to a quantity associated with an interaction. In some embodiments, an interaction value may be determined by a user, and may correspond to a preferred amount a user is willing to spend to obtain a particular resource.

"Tokenization" can refer to a process by which data is replaced with substitute data. For example, a PAN may be tokenized by replacing the PAN with a substitute number (e.g., a token) that may be associated with the PAN. Further, tokenization may be applied to any other information that may be replaced with a substitute value.

"Token exchange" or "de-tokenization" can include a process of restoring the data that was substituted during tokenization. For example, a token exchange may include replacing a payment token with a corresponding PAN that was associated with the payment token during tokenization of the PAN. Thus, the de-tokenization may refer to the process of redeeming a token for the associated PAN value based on a token-to-PAN mapping stored, for example, in a token vault. The ability to retrieve a PAN in exchange for the associated token may be restricted to specifically authorized entities, individuals, applications, or systems. Further, de-tokenization or token exchange may be applied to any other information. In some embodiments, token exchange may be achieved via a transactional message, such as an ISO message, an application programming interface (API), or another type of web interface (e.g., web request). Token exchange may also be achieved via a credential request message, whereby a requesting entity, which may be a token holder, makes a request to receive a PAN associated with a token.

An "access token" may refer to a substitute for a real credential. An access token can be used to access a resource or in an interaction between two entities. In some embodiments, an access token may include a series of alphanumeric characters that may be used as a substitute for a PAN. For example, an access token "4900 0000 0000 0001" may be used in place of a PAN "4147 0900 0000 1234." In some embodiments, an access token may be "format preserving" and may have a numeric format that conforms to the account identifiers used in existing transaction processing networks (e.g., ISO 8583 financial transaction message format).

A "transferable access token" may refer to an access token that can be transferred between users. A transferable access token may be a substitute for a credential that is not uniquely associated with a given user or group of users, enabling any user in possession of the transferable access token to use the transferable access token in an interaction. In some embodiments, a transferable access token may comprise a resource provider identifier corresponding to a resource provider. Such transferable access tokens can only be used in interactions with the resource provider specified by the resource provider identifier.

A "communication device" may comprise any suitable device that may provide remote or direct communication capabilities. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of communication devices include desktop computers, videogame consoles, mobile phones (e.g., cellular phones), PDAs, tablet computers, net books, laptop computers, personal music players, hand-held specialized readers, smart cards, etc. Further examples of communication devices include wearable devices, such as smart watches, fitness bands, ankle bracelets, rings, earrings, etc., as well as vehicles with remote or direct communication capabilities.

A "portable device" may refer to a device that can be easily carried or moved. In some embodiments, a portable device may refer to a device such as a credit or debit card. A portable device may be used to present a credential or access token during an interaction. A portable device may have some form of data storage, such as a magnetic strip or an EMVco chip, and a portable device may use the data storage in order to store an access token or credential. A portable device may be able to interface with an access device. In some embodiments, a portable device may be a communication device.

An "access device" may be any suitable device that provides access to a remote system. An access device may also be used for communicating with a resource provider computer, a transport computer, a remote server computer, an authorization computer, or any other suitable system. An access device may be located at a resource provider, such as a merchant. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, in which an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "acquiring entity" can refer to an entity that can come into possession of something. An acquiring entity may be a business entity (e.g., a commercial bank) that has a business relationship with a particular resource provider, merchant, or other entity. An acquiring entity may operate an acquiring entity computer, which may be referred to as a "transport computer."

An "authorizing entity" is an entity that can authorize or approve interactions. An authorizing entity may typically refer to a business entity (e.g., a bank) that maintains an account for a user and is capable of authorizing interactions such as the purchase of goods or services from a merchant. An authorizing entity may operate an "authorization computer."

An "authorization request message" may be an electronic message that requests authorization for an interaction. In some embodiments, an authorization request message can be sent to an authorization computer and/or an issuer of a payment card to request authorization for a transaction. According to some embodiments, an authorization request message may comply with ISO 8583, a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" or "user information" including, by way of example only: a service code, a CVV (card verification value), a dCVV (dynamic card verification value), a PAN (primary account number or "account number"), an access token, a user identifier (e.g., user name), an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in identifying and/or determining whether to authorize a transaction.

An "authorization response message" may be a message that responds to an authorization request. In some cases, it may be an electronic message reply to an authorization request message generated by an issuing financial institution or an authorization computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "remote server computer" can include a computer that that provides or services access tokens. In some embodiments, a remote server computer can facilitate requesting, determining (e.g., generating) and/or issuing access tokens, as well as maintaining an established mapping of access tokens to credentials such as primary account numbers (PANs) in a repository (e.g., a token vault). Additionally, a remote server computer can maintain established mapping of transferable access tokens to corresponding interaction values. In some embodiments, the remote server computer may establish an access token assurance level for a given access token to indicate the confidence level of the access token to PAN or interaction value binding. The remote server computer may include or be in communication with a token vault that stores generated access tokens. The remote server computer may support access token processing of payment transactions submitted using access tokens by de-tokenizing the token to obtain the actual PAN.

A remote server computer can be part of a payment processing network. A remote server computer can include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A "token vault" may refer to an access token service that includes a repository that maintains established access token mappings. According to various embodiments, the token vault may also maintain other attributes of the access token requestor that may be determined at the time of registration. The attributes may be used by the remote server computer or an authorization computer to apply domain restrictions or other controls during transaction processing. In some embodiments, the token vault may be a part of the remote server computer or an authorization computer. Alternatively, the token vault may be a remote repository accessible to the remote server computer or an authorization computer. Token vaults, due to the sensitive nature of the data mappings that are stored and managed in them, may be protected by strong underlying physical and logical security.

A "communication gateway" may refer to software or hardware that allows for secure communication between a communication device and a backend. A communication gateway may use cryptographic protocols to establish a secure communication channel between the communication device and the backend. In some embodiments, the backend may be an authorization computer, such that the communication gateway allows communication between communication devices and the authorization computer.

DETAILED DESCRIPTION

Figure 1:
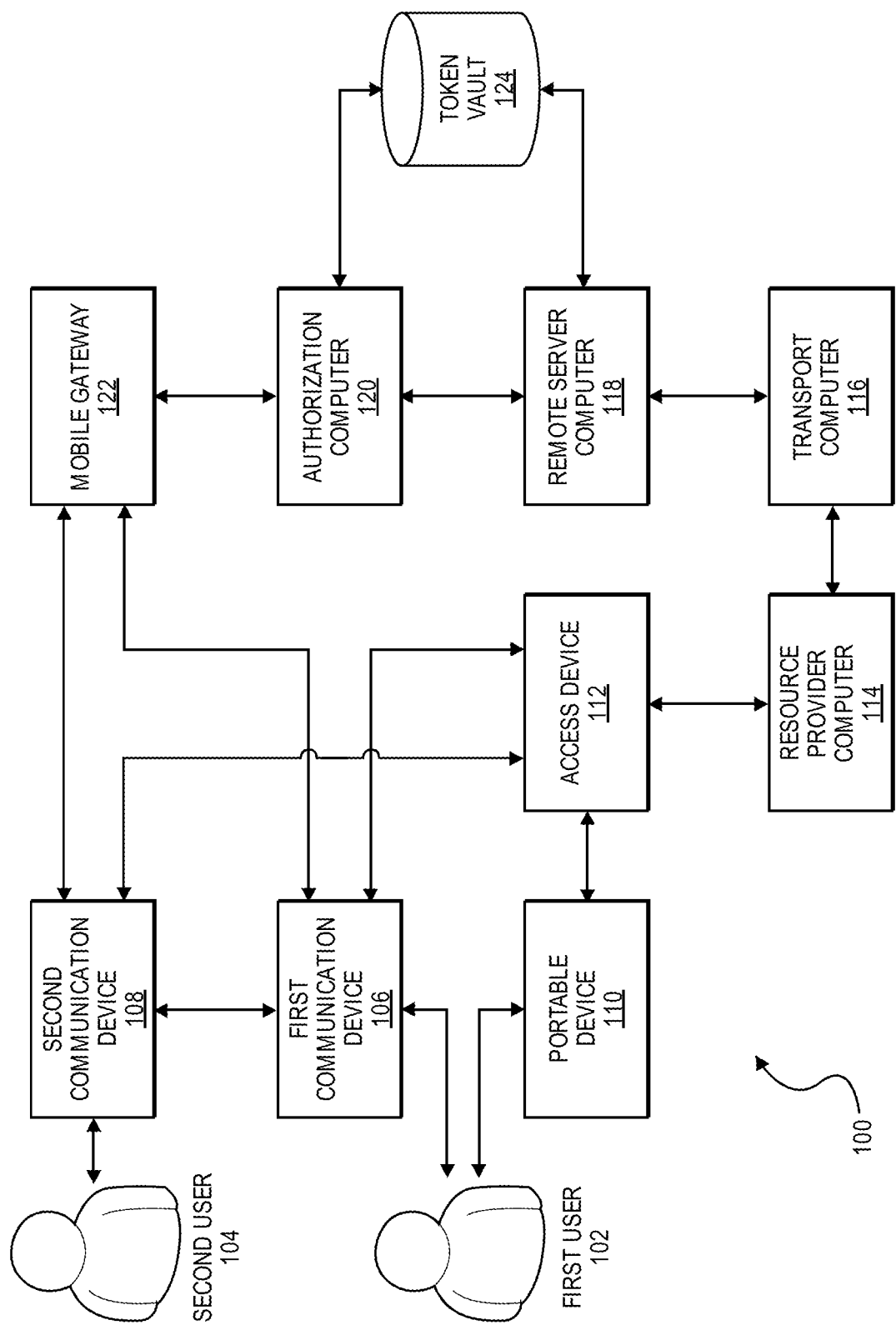
FIG. 1 shows a block diagram of an exemplary resource access control system according to some embodiments.

Embodiments of the invention are directed to methods and systems of provisioning, managing, and using transferable access tokens. A transferable access token, like an access token, can be used by a user during an interaction with a resource provider to gain access to a resource. Referring to FIG. 1, a system 100 or a similar system can be used to perform methods according to some embodiments.

The system 100 can comprise a first user 102, a second user 104, a first communication device 106, a second communication device 108, a portable device 110, an access device 112, a resource provider computer 114, a transport computer 116, a remote server computer 118, an authorization computer 120, a communications gateway 122, and a token vault 124. The users, communication devices, portable devices, access device, computers, gateway and token vault may be in operative communication with one another via one or more communications networks.

A communications network can take any suitable form, which may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the entities, providers, users, devices, computers and networks may be transmitted using a secure communications protocol such as, but not limited to, File Transfer Protocol (FTP); HyperText transfer Protocol (HTTP); Secure HyperText Transfer Protocol (HTTPS), Secure Socket Layer (SSL), ISO (e.g., ISO 8583) and/or the like.

The examples below primarily focus on transactional interactions between consumer users and merchant resource providers. However, these examples are provided for the purpose of illustration. The methods and systems for provisioning, managing and using transferable access tokens as described herein are not restricted to transactions.

The first user 102 and second user 104 can be users of the first communication device 106 and second communication device 108 respectively. Additionally, the first user 102 may also be an owner and/or operator of a portable device 110.

The first communication device 106 and second communications devices 108 generally refer to electronic devices with communication functionality, for example, smart phones. The first communication device 106 and second communication device 108 can be better understood with reference to FIG. 2.

Figure 2:
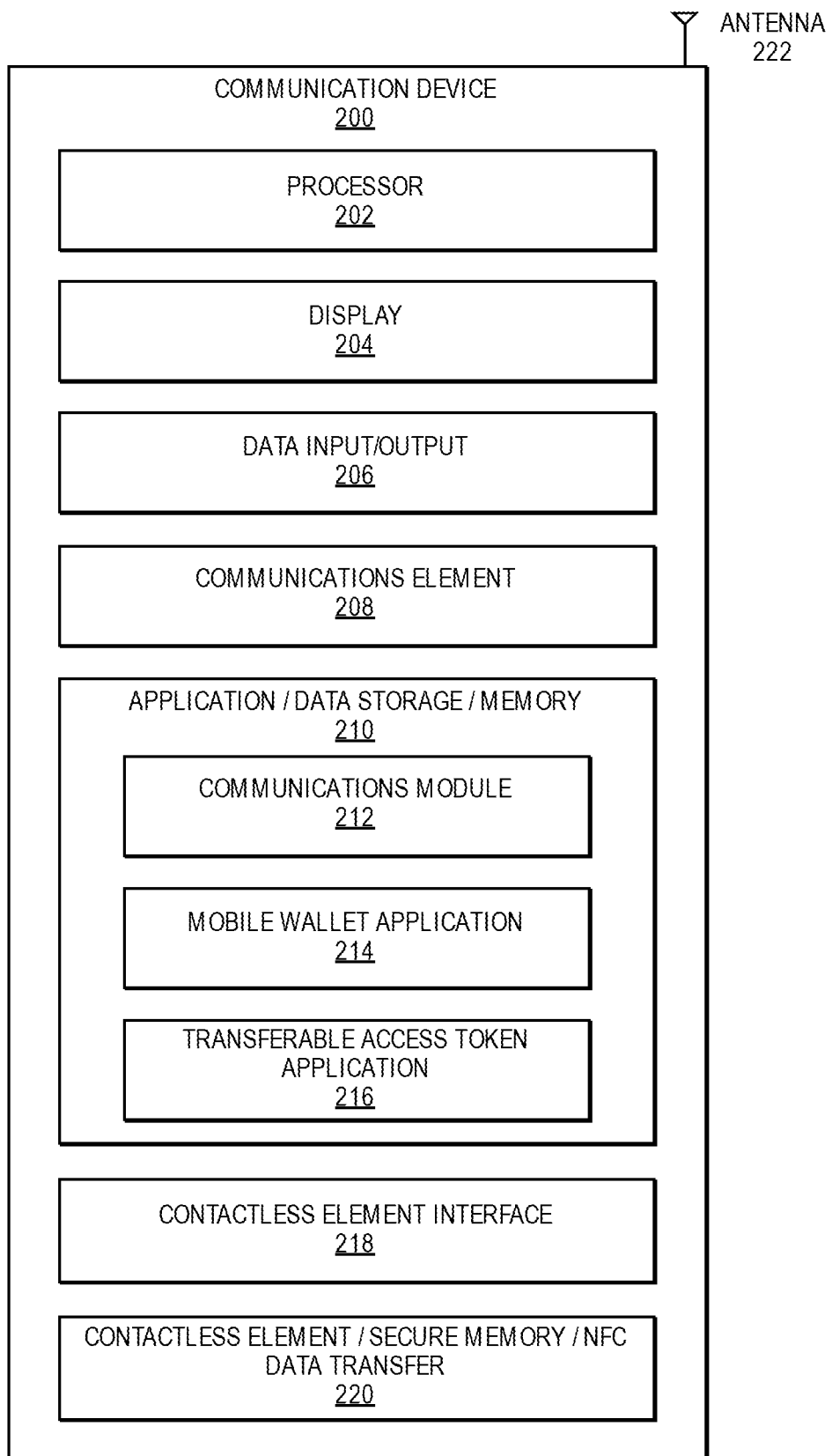
FIG. 2 shows a block diagram of an exemplary communication device according to some embodiments.

FIG. 2 shows an exemplary communication device 200 according to some embodiments. Communication device 200 may include circuitry that is used to enable certain device function, such as wireless communication or telephony. The functional elements responsible for enabling those functions may include a processor 202 that can execute instructions that implement the functions and operations of the device. Processor 202 may access data storage 210 (or another suitable memory region or element) to retrieve instructions or data used in executing the instructions. Data input/output element 206, such as a keyboard or touchscreen, may be used to enable a user to operate the communication device 200 (for example, allowing the user to navigate to a mobile wallet application 214). Data input/output 206 may also be configured to output data (via a speaker, for example). Display 204 may also be used to output data to a user. Communications element 208 may be used to enable data transfer between communications device 200 and a wired or wireless network (via antenna 222, for example), enable data transfer functions, and may be used to assist in connectivity to the Internet or another network. Communication device 200 may also include contactless element interface 218 to enable data transfer between contactless element 220 and other elements of the device, where contactless element 220 may include a secure memory and a near field communication data transfer element (or another form of short range communication technology). As noted, cellular phones, smart phones, wearable devices, laptop computers, or other similar devices are examples of communication devices in accordance with embodiments.

The data storage 210 may comprise a computer readable medium that may also comprise a number of software modules, such as a communications module 212, a mobile wallet application 214, and a transferable access token application 216.

The communications module 212 may comprise code enabling the processor 202 to implement or enable communications between the communication device 200 and other devices, such as other communication devices, an access device, or an authorization computer via a communication gateway. The communications module 212 may allow communication according to any appropriate protocol, such as TCP, UDP, IS-IS, OSPF, IGRP, EIGRP, RIP, BGP, etc. It may enable secure communication by enabling the processor 202 to establish a secure or encrypted communication channel between the communication device 200 and other devices. For example, the communications module 212 may comprise code executable by the processor 202 for performing a key exchange (such as a Diffie-Hellman key exchange) between the user device 200 and another device. The communication module 212 may further allow the transmission of access tokens, transferable access tokens and/or other user information to other devices, such as other communication devices or an access device.

The mobile wallet application 214 may comprise code enabling a user to manage access tokens using the communication device 200. For example, the mobile wallet application 214 may comprise code enabling the processor 202 to retrieve access tokens stored in the secure memory 220 via the contactless element interface 218. The mobile wallet application 214 may further comprise code enabling the communication device 200 to display any suitable access token information, for example, the time and date during which an access token was provisioned, an alias or identifier for the access token, the time and date of the most recent interaction involving the access token, etc. Further, the mobile wallet application 214 may comprise code enabling the processor 202 to display a graphical user interface (GUI) that enables a user to activate access token related functionality. This functionality may include assigning a new alias to an access token, marking an access token as stolen, reissuing an access token, removing or revoking an access token, etc. Further, the mobile wallet application 214 may comprise code enabling the communication device 200 to send access tokens to an access device, remote server computer, or authorization computer. For example, during a transaction with a merchant, the mobile wallet application 214 can be used to provide an access token (such as a tokenized PAN) to the merchant via an access device. As another example, the mobile wallet application 214 may comprise code enabling the communication device 200 to send a request to revoke or replace a specified access token to the authorization computer.

The transferable access token application 216 may comprise code, executable by the processor 202 for storing and managing transferable access tokens. The transferable access token application 216 may be provisioned on the communication device 200 by a remote server computer or an authorization computer. The transferable access token application 216 can display transferable access tokens or their aliases in addition to relevant information such as interaction values. The transferable access token application 216 can generally perform the same functions for transferable access tokens as the mobile wallet application 214 can perform for conventional access tokens. In some embodiments, the transferable access token application 216 and mobile wallet application 214 may be a single application.

The transferable access token application 216 can additionally comprise code, executable by the processor 202 for initiating the combination or separation of transferable access tokens. This may involve receiving and interpreting input from the user via the data input/output 206, such as the selection of a particular transferable access token or group of transferable access tokens. As an example, a user could drag their finger over GUI elements (displayed on a touch screen) corresponding to two distinct transferable access tokens, such that the transferable access tokens are clearly selected (e.g., as indicated by a selection glow or other relevant visual effect). The user can select a functional button, such as a "combine" button. The transferable access token application 216 can be used by the processor 202 to generate a transferable access token combination message comprising the selected transferable access tokens. As an example, the two transferable access tokens may be represented by alphanumeric sequences such as "12345" and "23421," and the transferable access token combination message may comprise these two alphanumeric sequences, along with a message indicating that the two transferable access tokens should be combined. The transferable access token application 216 can be used by the processor 202 to transmit the transferable access token combination message to a remote server computer or authorization computer. The recipient computer can interpret the message, combine the transferable access tokens, and transmit a response message comprising the combined transferable access token back to the communication device 200. For an exemplary transferable access token combination message comprising two transferable access tokens "12345" and "67890," an authorization computer may determine the interaction values (e.g., "$10.00" and "$20.00") associated with these transferable access tokens by searching or querying a transferable access token database. The authorization computer may determine the sum of these interaction values ($30.00), generate a new transferable access token (e.g. "42024") and assign the combined interaction value to the new transferable access token. The authorization computer can revoke the combined transferable access tokens and transmit the new transferable access token back to the communication device 200. The processor 202 can use the transferable access token application 216 to interpret the response message and then securely stored the received transferable access token in the secure memory 220 using contactless element interface 218.

Similar steps can be performed in splitting a transferable access token. A user can select a transferable access token using GUI elements, select a button that indicates that the user wishes to split the transferable access token, and indicate how the user wants to split the access token. For example, the user can type desired interaction values or split values into text boxes. For a transferable access token with corresponding interaction value $100.00, the user could type a value such as $35.00 into a first text box and $65.00 into a second text box, indicating that the user wants the transferable access token to be split into two transferable access tokens, one with an interaction value of $35.00 and one with an interaction value of $65.00. The transferable access token application 216 can generate a message comprising the transferable access token and the split instructions and transmit the message to a remote server computer or an authorization computer. For example, the transferable access token split message can comprise an alphanumeric sequence corresponding to the transferable access token, such as "12345" and two or more split values, such as "$10.00" and "$20.00." The recipient computer can split the transferable access tokens and transmit a message or messages comprising the two transferable access tokens back to the communication device 200. For example, for an exemplary transferable access token split message comprising the transferable access token "12345," and the split values "$10.00" and "$20.00," the authorization computer may determine that the transferable access token "12345" has an interaction value of "$30.00," generate two transferable access tokens (e.g., "49142" and 02913"), and associate the interaction value $10.00 with the first transferable access token "49142" and the interaction value $20.00 with the second transferable access token "02913." The authorization computer can transmit the two transferable access tokens back to the communication device 200, for example, over the air, via a communication network such as a cellular communication network or the Internet, via an authorization response message transmitted to an access device, or via a communication gateway. The transferable access token application 216 along with the contactless element interface 218 can store the transferable access tokens in secure memory 220.

Returning to FIG. 1, the first user 102 can use the first communication device 106 in an interaction with a resource provider via the access device 112. Alternatively the first user 102 can use the portable device 110 in an interaction with the resource provider via the access device 112. As an example, in a first interaction comprising a transaction between a merchant and the first user 102, the first user 102 can use the first communication device 106 to present an access token to the merchant via the access device 112. Alternatively, the first user 102 can present a payment credential such as a PAN to the access device 112 via a potable device 110 such as a credit card. In some embodiments, the portable device 110 is the first communication device 106.

The access device 112, as described above, may be any suitable device that provides access to a remote system. In some embodiments, the access device 112 may be a device such as a point of sale terminal. The access device 112 may possess any suitable interface for receiving credentials, access tokens, or transferable access tokens. For example, a near-field communication interface, other radio-frequency interface, magnetic stripe reader, etc. In some embodiments, the access device 112 may generate authorization request messages based on the received credentials, access tokens, or transferable access tokens. In other embodiments, the access device 112 may transmit the credentials to the resource provider computer 114, and the resource provider computer 114 may generate the authorization request message.

Regardless, once an authorization request message has been generated, the resource provider computer 114 can transmit the authorization request message to a transport computer 116. In some embodiments, the transport computer 116 may be associated with an acquirer bank that maintains an account on behalf of the resource provider. In others, the transport computer 116 may be an intermediary computer in the resource access control system. The transport computer 116 can forward the authorization request message to the remote server computer 118.

In some embodiments of the invention, the remote server computer 118 performs tokenization and token related functionality. In such embodiments, the remote server computer 118 can manage access tokens and transferable access tokens, and can be in communication with a token vault 124. In some embodiments, the remote server computer 118 can include the token vault 124, such that the token vault 124 and the remote server computer 118 comprise a single entity. In some embodiments, the remote server computer 118 can detokenize the access token or transferable access token, modify the authorization request message to include the relevant credential, and transmit the authorization request message to the authorization computer 120 for authorization.

Additionally, if the remote server computer 118 performs access token related functionality, the remote server computer 118 may issue and generate transferable access tokens to either the first communication device 106 or second communication device 108 via the mobile gateway 122. Additionally, the remote server computer 118 may receive messages or commands from either communication device. These messages or commands may include a transferable access token combination message, which may indicate two or more transferable access tokens that a user wants to combine into a single transferable access token. The remote server computer 118 may combine the transferable access tokens and transmit the combined transferable access token back to the requesting communication device. These messages or commands may also include a transferable access token split message, indicating a transferable access token and one or more split values. The remote server computer 118 can determine the interaction value associated with the received transferable access token, and split the transferable access token into a number of other transferable access tokens, which the remote server computer 118 can transmit back to the requesting communication device. Regardless of whether the remote server computer 118 performs access token operations, the remote server computer 118 can transmit the authorization request message to the authorization computer 120.

The authorization computer 120 can interpret the authorization request message and authorize or deny the interaction between the first user 102 and the resource provider. In some embodiments, the authorization computer 120 performs access token related functionality, as introduced above with reference to the remote server computer 118. The tokenization functionality as performed by the authorization computer 120 can be understood with reference to the description above. In some embodiments, the authorization computer 120 can be a computer associated with an issuing bank. The issuing bank may have issued the portable device 110 to the first user 102, and may maintain a payment account on behalf of the first user 102. The authorization computer 120 may be better understood with reference to FIG. 3.

Figure 3:
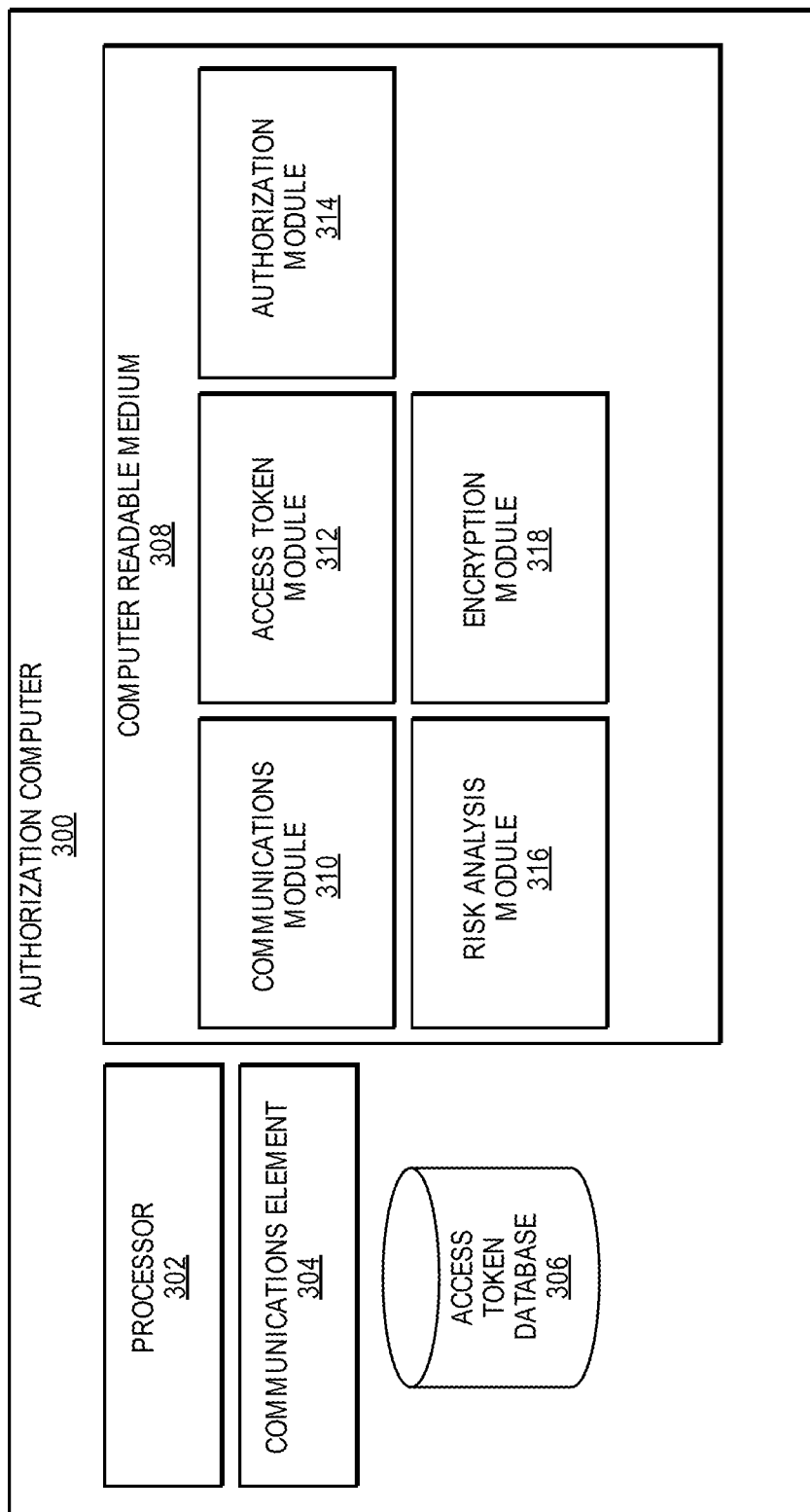
FIG. 3 shows a block diagram of an exemplary authorization computer according to some embodiments.

FIG. 3 shows a block diagram of an exemplary authorization computer 300 according to some embodiments. The authorization computer may comprise a processor 302, a communication element 304, an access token database 306, and a computer readable medium 308 comprising a communications module 310, an access token module 312, an authorization module 314, a risk analysis module 316, and an encryption module 318.

It should be noted that in some embodiments the authorization computer 300 may not perform access token related functionality, instead relying on a remote server computer to perform such functionality. In these embodiments, the authorization computer 300 may not possess an access token database 306 or an access token module 312. It should be understood that in embodiments where the authorization computer 300 does not perform such functionality, the corresponding components and software modules may be integrated into a remote server computer. Such a remote server computer can be understood with reference to the description above and below. Particularly, descriptions of the access token database 306, tokenization module 312, etc., are applicable to a remote server computer that performs the above-noted operations.

The processor 302 may be any suitable processing apparatus or device as described above. The communications element 304 may comprise a network interface that enables the authorization computer 300 to communicate with other computers or systems over a network such as the Internet. The access token database 306 may comprise any suitable data structure for storing access tokens, transferable access tokens, and their relations to any other appropriate data, such as underlying credentials. The access token database 306 may be accessed by the processor 302 in order to parse through, determine, access, or operate on any records in the access token database 306. These operations can include deleting records, modifying records, and generating new records.

The access token database 306 may also be referred to as a token vault. In some embodiments, the access token database 306 may be external to the authorization computer 300, as shown in FIG. 1. Entries in the access token database 306 can take any suitable form. For example, an access token in the access token database 306 can be stored in association with its credential and any other relevant information, such as the user the access token was issued to, the date and time when the access token was issued, etc. Entries in the access token database 306 may be encrypted and protected with strong underlying hardware security. An exemplary entry in an access token database is presented further below with reference to FIG. 7.

The communications module 310 may comprise code that causes or enables the processor 302 to generate messages, reformat messages, and/or otherwise communicate with other entities or computers. This may include receiving authorization request messages from a remote server computer and generating and transmitting authorization response messages. It may also include receiving transferable access token split or combination messages from communication devices. The communication module 310 may enable the authorization computer 300 to communicate over a network according to any appropriate communication protocol, such as TCP, UDP, etc.

The access token module 312 may comprise code that enables the processor 302 to perform access token related functionality. This may include generating new access tokens or transferable access tokens, associating the access tokens or transferable access tokens with credentials and/or interaction values, storing the access tokens or transferable access tokens in the access token database 306, detokenizing access tokens, updating access token or transferable access token records in an access token database, splitting transferable access tokens, combining transferable access tokens, etc. The access token module 312 may also comprise any appropriate decision making logic that guides the performance of the above functions. For example, the access token module 312 may comprise code that enables the authorization computer 300 to determine if a request to generate an access token is being generated for a fraudulent purpose. For example, a thief may have acquired a credential and may request an access token based on the credential. In this example, the access token module 312 may comprise code that allows the authorization computer 300 to evaluate the context of the request (for example, where the request originated from, the time of the request, previous behavior of the user corresponding to the credential, etc.) and determine that the request is fraudulent. Upon determining that the request is fraudulent, the authorization computer 300 does not generate the requested access token and terminates communication with the requestor.

The generation of an access token may take different forms. The following are intended only as non-limiting examples. As one example, an access token can be generated using a cryptographically secure random number generator. Code on the access token module 312 can be used to generate a random number. The random number can be modified in order to adhere to access token standards (e.g., in a transactional system, the random number could be modified to adhere to ISO 8583 by padding the random number or truncating the random number such that it meets length requirements.) The authorization computer 300 can verify that the generated random number has not already been assigned by searching the access token database 306. If the random number has already been assigned to a credential, the authorization computer 300 can generate a new random number and repeat the process. Once a unique access token has been generated, the access token can be stored in the access token database in association with the credential (e.g., PAN) that the access token replaces.

As another example, the access token module 312 can comprise code executable by the processor 302 for implementing a collision resistance hash function. The credential to be tokenized can be provided as an input to the hash function. The generated access token can be the output of the hash function. The access token and the credential could be stored in the access token database 306 in association with one another.

Likewise, the generation, association, and storage of a transferable access token can take many forms. For example, a transferable access token can be generated by the same random number method as described above. As another example, for transferable access tokens that are not associated with a credential, a "dummy credential" can be generated that corresponds to the transferable access token. This dummy credential may be a unique credential that is not tied to a particular user or entity (e.g., a username for a non-existent user). The dummy credential can be hashed to produce a transferable access token. The transferable access token can be stored in the access token database 306 in association with the dummy credential. Additionally, the authorization computer 300 may include other information in the access token database 300, such as user identifier corresponding to the recipient of the transferable access token. The other information may additionally comprise the interaction value associated with the transferable access token. A generated access token or transferable access token can be provisioned to a user or communication device. For example, the authorization computer 300, using code comprising the communications module 310 and tokenization module 312 could generate and transmit a message comprising the generated access token or transferable access token to a communication device operated by a user. The message may be transmitted in an encrypted form in order to protect the access token or transferable access token.

The access token module 312 may also comprise code enabling the processor 302 to split or combine transferable access tokens received from communication devices. For example, the authorization computer 300 could receive a transferable access token combination message from a communication device. The transferable access token combination message can comprising two or more transferable access tokens. Upon processing the message, the processor 302 can use code in the access token module 312 to parse through the access token database 306 and locate the database entries corresponding to the received access tokens. The authorization computer 300 can then determine the interaction values associated with each access token and perform arithmetic to determine the combined interaction value. The authorization computer 300 can then generate a new transferable access token and store it in the access token database 306 in association with the combined interaction value. The authorization computer 300 can additionally store any relevant information related to the combination, e.g., the transferable access tokens that were combined, the interaction values of those transferable access tokens, the users that those transferable access tokens were initially provisioned to, etc. Additionally, the authorization computer 300 can revoke the transferable access tokens that were combined and delete their records from the access token database 306. Alternatively, the authorization computer 300 can flag the transferable access tokens as revoked, but keep the records in the access token database 306. Additionally, the authorization computer 300 can transmit the combined transferable access token to a communication device, either over the air directly, via a communication network such as the Internet or a cellular communication network, via an authorization response message transmitted to an access device, or via a communication gateway.

For example, the authorization computer 300 can receive a transferable access token combination message such as "COMBINE; "1234 9999 1111 0000"; "0291 9123 1839 1039";" indicating that a user associated with a communication device wishes to combine two transferable access tokens corresponding to the alphanumeric sequences "1234 9999 1111 0000" and "0291 9123 1839 1039." The authorization computer 300 can search the access token database 306 to determine the interaction values associated with these two exemplary transferable access tokens, e.g., "4 train rides" and "2 train rides." The authorization computer 300 can sum the interaction values (6 train rides), and generate a new transferable access token, such as "1000 4848 2810 3256" and store the new transferable access token in the access token database 306 in association with the interaction value "6 train rides." The authorization computer 300 can revoke the transferable access tokens "1234 9999 1111 0000" and "0291 9123 1839 1039" by deleting them from the access token database 306 or by flagging them in the access token database 306 with a revocation flag. The authorization computer 300 can transmit the combined transferable access token "1000 4848 2810 3256" to the requesting communication device, either directly over the air, via a communication network such as a cellular communication network or the Internet, or via an authorization response message transmitted to an access device.

Similarly, the access token module 312 can also comprise code enabling the processor 302 to split a transferable access token. The authorization computer 300 can receive a split request message from a communication device, interpret the message, and then use the processor 302 and code in the tokenization module 312 to split the transferable access token. The authorization computer 300 can interpret the message to determine how the user wants the access token to be split. For example, the user can request that a transferable access token with interaction value of $100.00 be split into four transferable access tokens with interaction values of $25.00 each. The authorization computer 300, using code in the access token module 312 can generate four transferable access tokens and store them in association with their respective interaction values and any other relevant information (e.g., a statement of the split, the communication device or user that the transferable access tokens will be provisioned to, a timestamp, etc.). The authorization computer 300 can revoke the transferable access token that was split and update the access token database 306 (e.g., by deleting the database entry or flagging the database entry as corresponding to a revoked transferable access token).

As an example, the authorization computer 300 may receive a transferable access token split message such as "SPLIT; EQUAL; "1020 3928 1281 8031"; 4;" indicating that the requesting user wants the transferable access token "1020 3928 1281 8031" to be split into four transferable access tokens with equal interaction values. The authorization computer 300 may query the access token database 306 to determine the interaction value associated with the transferable access token, e.g., "$20.00." The authorization computer 300 may determine four equal values that sum to the interaction value of the transferable access tokens (i.e., "$5.00"). The authorization computer 300 may generate four new transferable access tokens. These four new transferable access tokens may comprise alphanumeric sequences associated with the original transferable access token, e.g., "1020 3928 1281 8031-1," "1020 3928 1281 8031-2" "1020 3928 1281 8031-3," and "1020 3928 1281 8031-4." As an alternative, the authorization computer 300 may generate four random alphanumeric sequences and assign those alphanumeric sequences to the four new transferable access tokens. The authorization computer 300 may store the four new transferable access tokens in the access token database 306 in association with the interaction value "$5.00." The authorization computer 300 may revoke the old transferable access token "1020 3928 1281 8031" either by deleting the corresponding record from the access token database 306 or by flagging it as revoked in the access token database 306. The authorization computer 300 can generate a split response message comprising the four transferable access tokens and transmit the split response message back to the requesting communication device, either over the air, via a communication network such as the Internet or a cellular communication network, or via an authorization response message transmitted to an access device. The response message can be transmitted in an encrypted form.

The authorization module 314 may comprise code that causes or enables the processor 302 to perform authorization processing. For example, the authorization module 314 may contain logic that causes the processor 302 to approve or decline authorization request messages. This can involve the processor 302 evaluating, for example, the time at which the authorization request was made, the resource provider associated with the authorization request, a credential, etc. and authorizing the authorization request based on the evaluation.

The risk analysis module 316 can comprise code, executable by the processor 302 for analyzing the risk of an interaction or the risk of providing an access token or a transferable access token to a particular communication device. For example, the risk analysis module 318 may contain logic that causes the processor 302 to evaluate information provided in an authorization request message, access token provisioning message, transferable access token provisioning message, transferable access token split message or transferable access token combination message, and determine risk levels associated with performing any of these functions.

The encryption module 318 can comprise code enabling the processor 302 to encrypt data. This can include access tokens or transferable access tokens prior to transmitting the access tokens or transferable access tokens to their respective recipients. The encryption module 318 can additionally comprise code enabling the processor 302 to decrypt data, for example, encrypted authorization request messages or encrypted transmissions from communication devices. The encryption module 318 can comprise code enabling the processor 302 to perform either symmetric or asymmetric key cryptography. The encryption module 318 can comprise code enabling the use of any appropriate cryptosystem, such as RSA, DES, 3DES, Blowfish, etc. The encryption module 318 may additionally comprise code enabling the processor 302 to perform key-exchanges (such as a Diffie-Hellman key exchange) with other computers or devices.

Returning to FIG. 1, the mobile gateway 122 can be a computerized system that enables the authorization computer 120 (or in some embodiments, the remote server computer 118) to communicate with the first communication device 106 or second communication device 108. As described above, these communications may include transmitting provisioned access tokens or transferable access tokens to the first communication device 106 or second communication device 108. Additionally, the mobile gateway 122 may receive requests to combine or split access tokens from the first communication device 106 or second communication device 108 and forward these requests to the authorization computer 120 or remote server computer 118.

Methods according to embodiments will now be described with reference to FIGS. 4-6.

Figure 4:
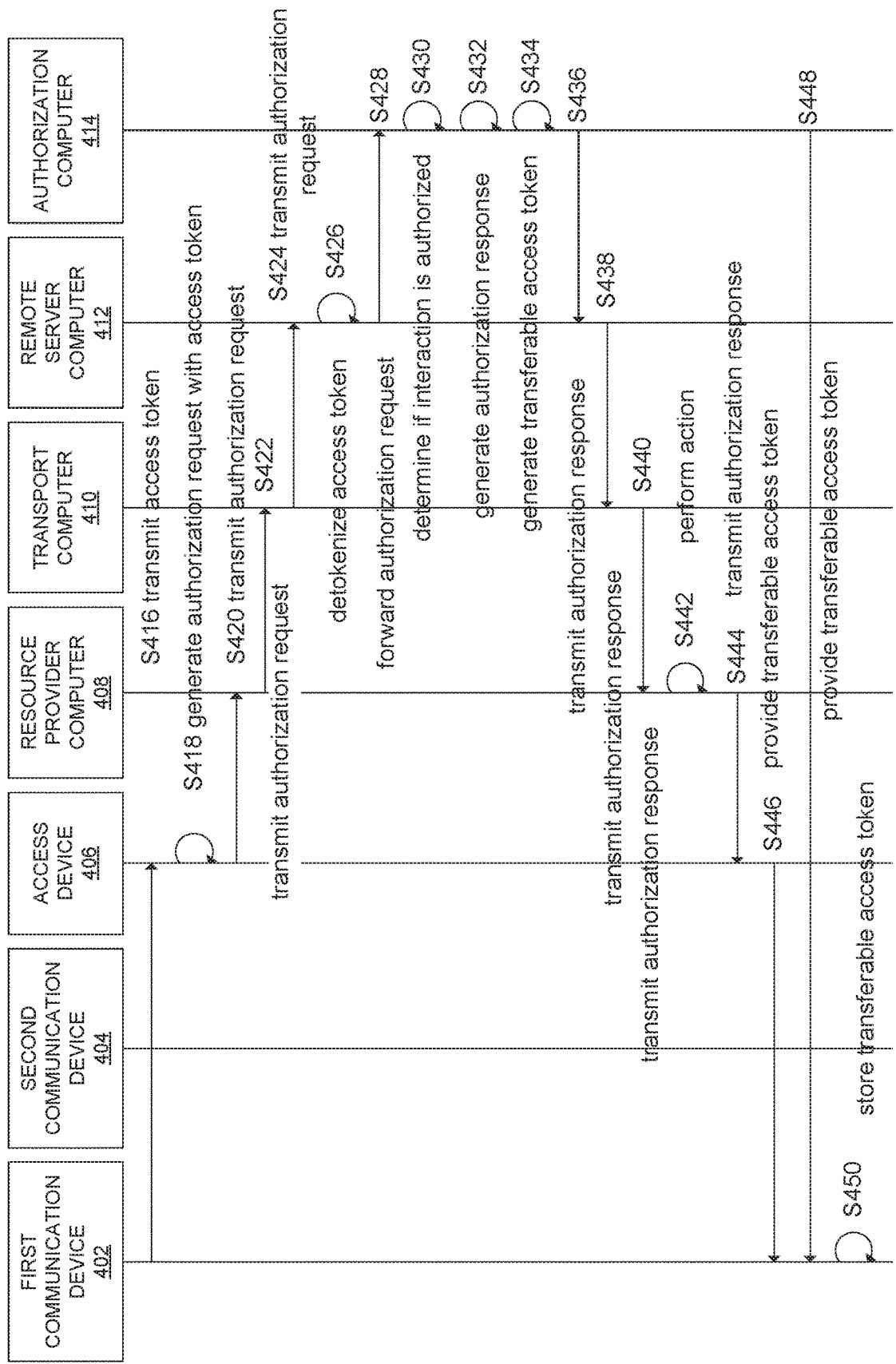
FIG. 4 shows a sequence diagram of an exemplary transferable access token provisioning method according to some embodiments.

FIG. 4 shows a sequence diagram of a method of provisioning a transferable access token according to some embodiments of the invention.

At step S416, the first communication device 402 can transmit an access token to access device 406 as part of a first interaction between a first user associated with the first communication device 402 and a resource provider (such as a transaction between the first user and a merchant). The access token can be transmitted via any appropriate means of communication (such as near field communication). The first user of the first communication device 402 can place the first communication device 402 in close proximity to the access device 406. The first communication device 402 can generate a radio frequency signal that encodes the access token and transmit the radio frequency signal over the air. The access device 406 can receive the access token via the radio frequency signal.

Alternatively, the access device 406 can receive the access token from a portable device. The portable device can transmit the access token to the access device 406 in a similar manner as described above. Alternatively, the portable device can interface with the access device 406 via a chip interface or a magnetic strip interface, and transmit the first access token to the access device 406 via the chip interface or the magnetic strip interface.

Additionally, the first user of the first user device 402 or the portable device may provide additional information to the access device 406. For example, the first user may use a keypad on the access device to input a PIN, username, password, an interaction value or any other appropriate information.

At step S418, the access device 406 can generate an authorization request message comprising the access token, the interaction value and any other relevant interaction information (such as a verification cryptogram). A verification cryptogram may be an encrypted portion of interaction data that can be used to verify that the authorization request message was not tampered with during transmission.

At step S420, the access device 406 can transmit the authorization request to the resource provider computer 408. In some embodiments, the access device 406 does not generate the authorization request message. In these embodiments, step S420 instead comprises the access device 406 transmitting the information received from the first communication device 402, the portable device and/or the first user in step S416. The resource provider computer 408 can generate an authorization request message comprising this information.

At step S422, the resource provider computer 408 can transmit the authorization request message to a transport computer 410. In some embodiments, the transport computer 410 is a computer associated with an acquiring bank that maintains an account on behalf of the resource provider. In some embodiments, the authorization request message is instead transmitted to a resource provider gateway that routes the authorization request message to the transport computer 410.

At step S424, the transport computer 410 can transmit the authorization request message to the remote server computer 412 for further processing.

In some embodiments, at step S426, the remote server computer 412 can detokenize the access token in the authorization request message in order to determine the real credential associated with the access token. The remote server computer 412 can use the real credential associated with the access token in order to determine the authorization computer 414 corresponding to the authorization request message. The remote server computer 412 can additionally determine whether the first user is authorized to conduct the interaction. Additionally, the remote server computer 412 can modify the authorization request message by substituting the access token for the real credential before transmitting the authorization request message to the authorization computer 414. Alternatively, the remote server computer 412 may not perform tokenization functions, in which case the remote server computer 412 does not detokenize the access token.

In step S428, the remote server computer 412 forwards the authorization request message to the authorization computer 414.

At step S430, the authorization computer 414 can determine that the first interaction between the first user and the resource provider is authorized. The authorization computer 414 can use any of the methods described above with reference to FIG. 3. For example, the authorization computer 414 can evaluate an interaction cryptogram to verify that the authorization request message has not been tampered with, identify the credential corresponding to the access token and determine that the credential corresponds to the first user. Determining that the interaction between the first user and the resource provider is authorized can also involve verifying a PIN, CVV, username and password combination, or any other relevant information including in the authorization request message.

At step S432, the authorization computer 414 can generate an authorization response message. As described above, the authorization response message may be an electronic message reply to an authorization request message. The authorization response message may include a status indicator indicating the status of the authorization, e.g., approved, declined, etc. The authorization response message may include an authorization code that serves as proof of authorization.

At step S434, the authorization computer 414 can generate a transferable access token. The generation of the transferable access token may be accomplished using any suitable method, such as the methods described above with reference to FIG. 3. The transferable access token may be associated with the interaction value provided by the first communication device 402 or a first user of the first communication device 402 in step S416. The authorization computer 414 may include the transferable access token in the authorization response message. Alternatively, the authorization computer 414 can transmit the transferable access token to the first communication device 402 over the air, for example, via a wireless network such as a cellular communication network.

At step S436, the authorization computer 414 can transmit the authorization response message to the remote server computer 412.

At step S438, the remote server computer 412 can transmit the authorization response message to the transport computer 410.

At step S440, the transport computer can transmit the authorization response message to the resource provider computer 408.

At step S442, the resource provider computer 408 can perform any suitable action to complete the interaction between the resource provider and the first user of the first communication device 402. Assuming the interaction is authorized, this can involve providing the first user with the requested resource. For an exemplary building access control system, the resource provider computer 408 can provide the first user with access to the building, e.g., by transmitting a signal to unlock a computerized gate.

At step S444, the resource provider computer 408 can transmit the authorization response message or any relevant information contained in the authorization back to the access device 406. The access device 406 can display the information to the first user. For example, if the authorization request message is denied, the access device 406 can display a message such as "denied." In some embodiments, the authorization response message contains the transferable access token, and the transferable access token is included in the authorization response message so that the access device 406 can provide the transferable access token back to the first communication device 402.

At step S446, the access device 406 can provide the transferable access token to the first communication device 402 using a communication channel between the first communication device and the access device. For example, by transmitting the transferable access token to the communication device 402 via a contactless element or near field communication, as described above.

Alternatively, at step S448, if the transferable access token is not included in the authorization response message, the authorization computer 414 can search a database for a first communication address for the first communication device 402 and transmit the first transferable access device to the first communication device 402 over the air using the communication address.

At step S450, the first communication device 402 can store the received transferable access token in a secure memory element. The transferable access token can be used in further interactions with the resource provider, with another resource provider, or transferred to another user, such as a second user associated with second communication device 504.

Afterwards, a clearing and settlement process may be conducted between an acquirer bank associated with the transport computer 410 and an issuer bank associated with the authorization computer 414. For example, as part of provisioning a transferable interaction token with interaction value equal to $100.00, the clearing and settlement process may involve the transfer of $100.00 from a payment account associated with a first user of the first communication device 402 and a payment account associated with the resource provider.

Figure 5:
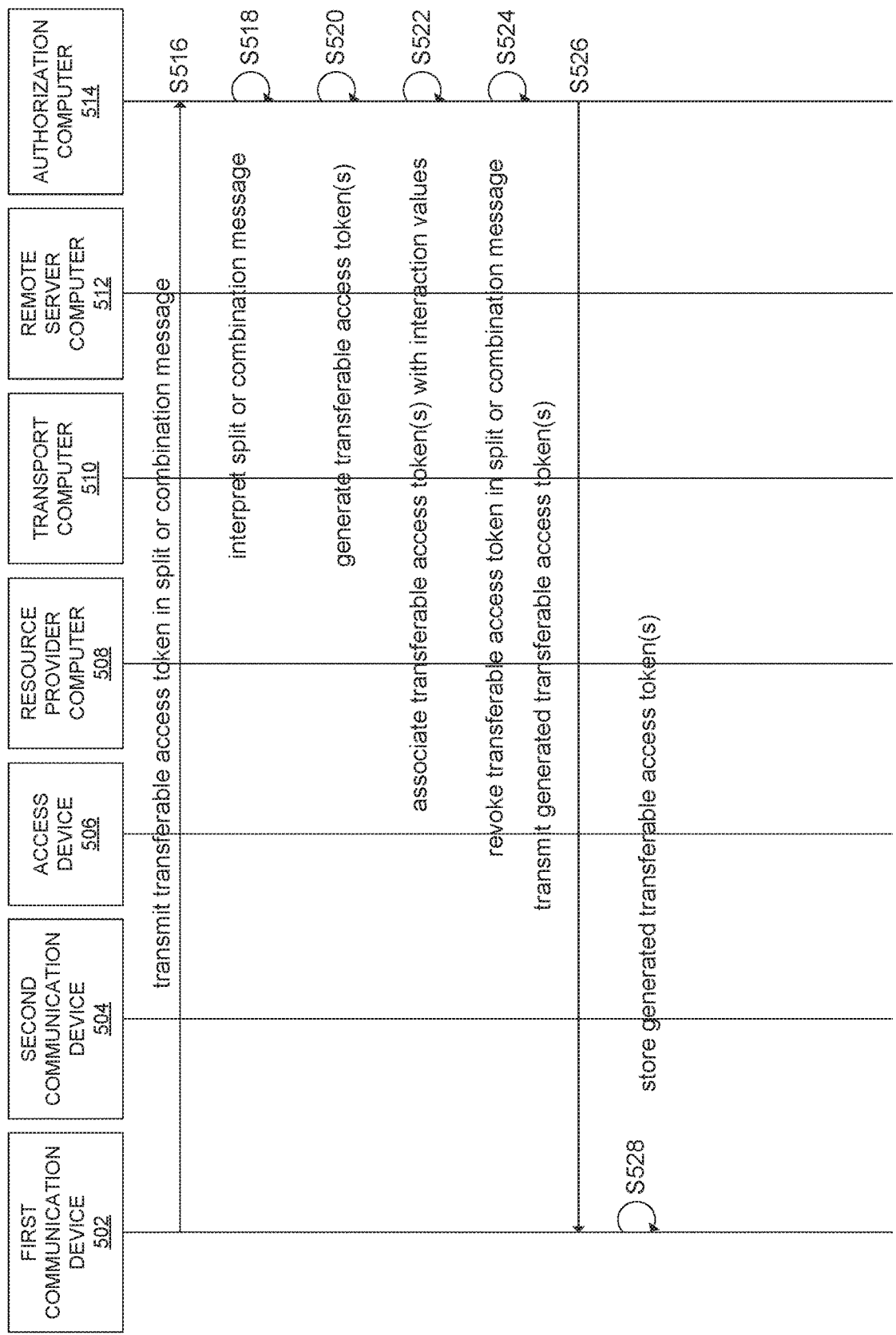
FIG. 5 shows a sequence diagram of an exemplary method of splitting or combining transferable access tokens according to some embodiments.

FIG. 5 shows a method of splitting or combining transferable access tokens according to some embodiments.

At step S516 the first communication device 502 can transmit a transferable access token split or combination message to the authorization computer 514. The transferable access token split or combination message may include any relevant information that the authorization computer 514 may use to split or combine transferable access tokens as directed. For example, a transferable access token combination message may include a status indicator that indicates that a first user of the first communication device 502 wishes to combine two or more transferable access tokens. The transferable access token combination message may additionally comprise the two or more transferable access tokens that the first user of the first communication device 502 wishes to combine. As an example, a transferable access token combination message may comprise a number of data fields and operational codes or indicators, such as "COMBINE; "1234 1010 2020 3981"; "8292 1392 1802 0191"; "DEVICE ID=9182"." This exemplary transferable access token combination message indicates that a user associated with the first communication device 502, with associated device ID "9182," wants to combine two transferable access tokens "1234 1010 2020 3981," and "8292 1392 1802 0191." The transferable access token combination message may additionally comprise any other suitable information, such as a username or other user identifier, a password, a communication address (such as a phone number) corresponding to the first communication device 502, etc.

As another example, a transferable access token split message may comprise a transferable access token and a split value. The split value may describe the value of one of the transferable access tokens produced by the split. For example, a transferable access token split message might comprise a transferable access token with interaction value of $100.00 and a split value of $55.00. The split value of $55.00 indicates the interaction value of one of the resulting transferable access has an interaction value of $55.00 and the other transferable access token has an interaction value equal to the difference between $100.00 and $55.00. In some embodiments, the transferable access token split message may take different forms. For example, a transferable access token split message may indicate the transferable access token to be split, the number of resulting transferable access tokens and the interaction value of each, such as "SPLIT, 1600 1234 5678 0000, 4, $10.00, $20.00, $30.00, $40.00." This exemplary transferable access token split message indicates that the transferable access token 1600 1234 5678 0000 should be split into four transferable access tokens with values $10.00, $20.00, $30.00, and $40.00.

At step S518, the authorization computer 514 can interpret the received transferable access token split or combination message and search an access token database for the database entry corresponding to the transferable access token or tokens included in the message. The authorization computer 514 can determine the interaction values associated with each transferable access token included in the transferable access token split or combination message based on the determined database entries.

Figure 7:
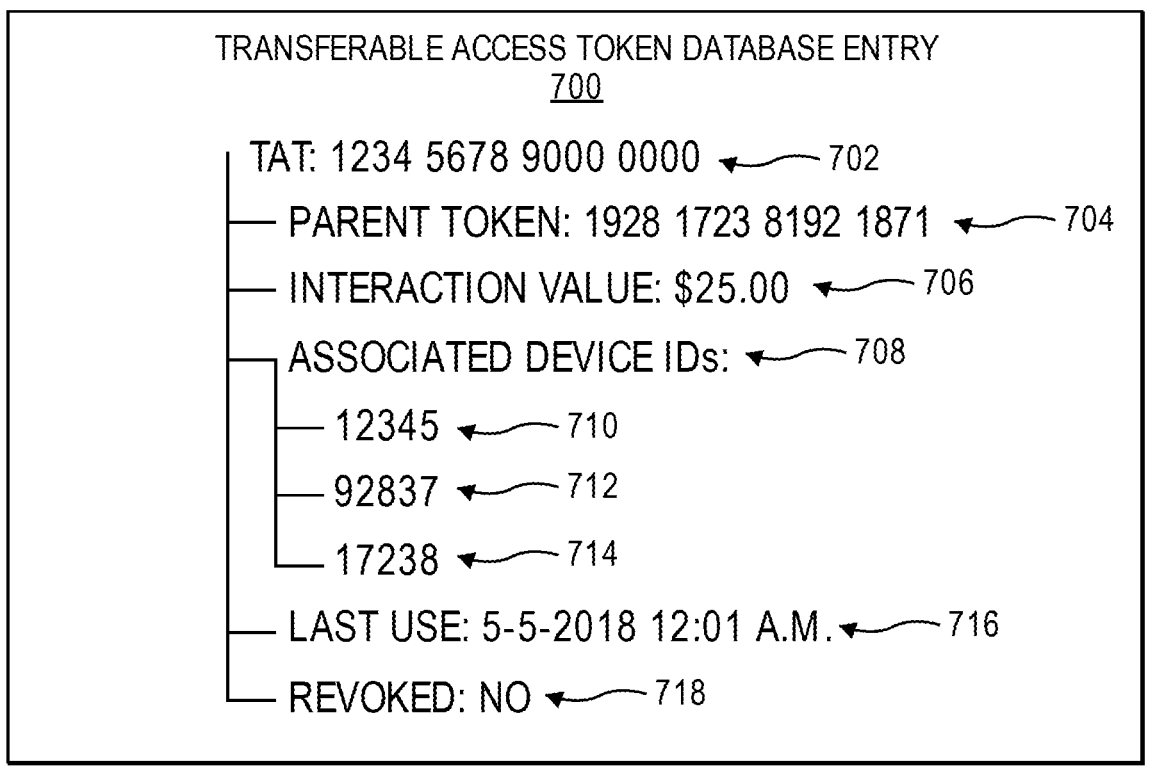
FIG. 7 shows an exemplary transferable access token database entry according to some embodiments.

Step S518 may be better understood with reference to FIG. 7, which shows an exemplary transferable access token database entry 700 comprising fields and subfields 702-718. The transferable access token database entry 700 may be a database entry for any appropriate database or data structure, such as an SQL database. Field 702 indicates the alphanumeric code corresponding to the transferable access token (TAT). Field 704, a subfield of field 702, indicates a parent transferable access token. The parent transferable access token 704 may refer to a transferable access token that transferable access token 702 was derived from. As an example, transferable access token 702 "1234 5678 9000 0000" may have been generated as a result of a transferable access token split involving the parent transferable access token 704 "1928 1723 8192 1871." Field 706, a subfield of field 702, indicates the interaction value associated with the transferable access token 702. Field 708, a subfield of field 702, indicates device identifiers associated with the transferable access token 702. These device identifiers (710-714) may refer to identifiers of communication devices that have used the transferable access token 702 in interactions. Field 716, a subfield of field 702, indicates the last time the transferable access token 702 was used in an interaction. Field 718, a subfield of field 702, indicates the revocation status of transferable access token 702.

As such, at step S518, the authorization computer 514 can interpret the transferable access token split or combination message and query an access token database for a transferable access token alphanumeric code contained in the split or combination message, e.g., "1234 5678 9000 0000." The authorization computer 514 can then parse the subfields of the corresponding transferable access token database entry until it determines the interaction value by determining the data value associated with the interaction value subfield.

At step S520, the authorization computer 514 can generate transferable access tokens depending on the transferable access token split or combination message received at step S516. For example, for a transferable access token split message specifying a split value, the authorization computer 514 can generate two new transferable access tokens. This can be accomplished by generating two new alphanumeric codes or identifiers using the methods described above, e.g., via a cryptographically secure random number generator. As another example, for a transferable access token combination message, the authorization computer 514 can generate a single new transferable access token. Additionally, at step S520, the authorization computer 514 can perform any verification logic for the transferable access token split or combination. For example, verifying that a split value received in the transferable access token split message is less than the interaction value associated with the transferable access token being split, in order to prevent a transferable access token with negative value from being generated.

At step S522, the authorization computer 514 can associate the newly generated transferable access tokens with their respective interaction values. For a transferable access token split message, the authorization computer 514 can associate one of the generated transferable access tokens with the split value and another transferable access token with a difference between the interaction value and the split value. For example, for a transferable access token with interaction value of $100.00 and split value of $60.00, the resulting two transferable access tokens may be associated with the interaction values $60.00 and $40.00 respectively. The authorization computer 514 can generate two new transferable access token database entries corresponding to the newly generated transferable access tokens, and populate fields in those database entries, such as setting interaction value fields equal to the split value ($60.00) and difference ($40.00) and setting parent transferable access token fields to the alphanumeric identifier associated with the transferable access token received in the transferable access token split message. For a transferable access token combination message, the generated transferable access token may be associated with an interaction value equal to the sum of the interaction values of each transferable access token included in the transferable access token combination message.

At step S524, the authorization computer 514 can revoke the transferable access tokens included in the transferable access token split or combination message. Revoking the transferable access tokens may comprise flagging the transferable access tokens in the access token database as revoked, updating a revocation status field in a transferable access token database entry, or deleting the record from the access token database.

At step S526, the authorization computer 514 can transmit a message comprising the resulting transferable access token or transferable access tokens to the first communication device 502. For a transferable access token combination message, this may comprise a single transferable access token. For a transferable access token split message, this may comprise a number of transferable access tokens.

At step S528, the first communication device 502 may store the transferable access token or transferable access tokens in a secure memory element. The first communication device 502 may also delete the revoked transferable access tokens from the secure memory element.

Figure 6:
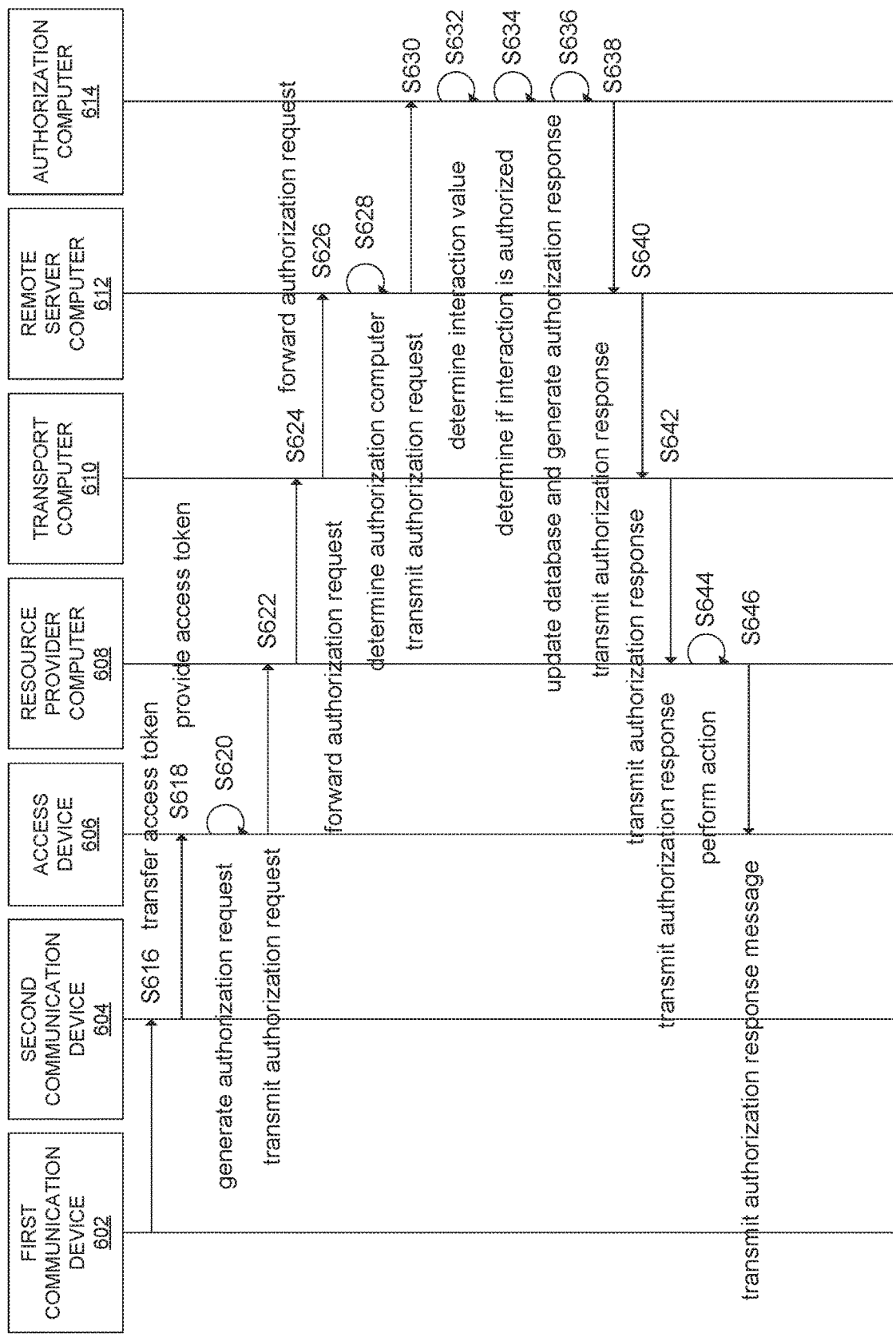
FIG. 6 shows a sequence diagram of an exemplary method for using a transferable access token in an interaction according to some embodiments.

FIG. 6 shows a method of transferring and using a transferable access token in a second interaction according to some embodiments of the invention.

At step S616, the first communication device 602 can transfer a transferable access token to the second communication device 604. The transferable access token can be transferable from the first communication device to the second communication device via near field communication. For example, a first user associated with the first communication device 602 can bring the first communication device 602 into close proximity with the second communication device 604, and the transferable access token can be transmitted wirelessly from a secure element of the first communication device 602 to a secure element of the second communication device 604 via contactless interfaces on the communication devices.

At step S618, the second communication device 604 can provide the transferable access token to the access device 606 as part of an interaction with a resource provider. For example, the second communication device 604 can be brought into close proximity with a point of sale terminal in a merchant's store, and the transferable access token can be transmitted to the point of sale terminal via a contactless element or interface on the second communication device 604.

At step S620, the access device 606 can generate an authorization request message comprising the transferable access token and any other relevant interaction information, such as a timestamp, a resource provider identifier, an interaction value (such as the price of goods or services being provided by a merchant resource provider), etc.

At step S622, the access device 606 can transmit the authorization request message to the resource provider 608. In some embodiments, the resource provider computer 608, not the access device 606 generates the authorization message. In these embodiments, the access device 606 may instead forward the information collected from the second communication device 604 to the resource provider computer 608. The resource provider computer 608 may generate the authorization request message as described above.

At step S624, the resource provider computer 608 may forward the authorization request message to a transport computer 610. In some embodiments, the transport computer 610 can be associated with an acquirer bank that manages a payment account on behalf of the resource provider.

At step S626, the transport computer 610 may forward the authorization request message to the remote server computer 612. In some embodiments, the remote server computer 612 may be associated with a payment processing network.

At step S628, the remote server computer 612 can determine the authorization computer 614 associated with the authorization request message. In some embodiments the remote server computer 612 may also perform tokenization functionality, including detokenizing the transferable access token to determine a dummy credential associated with the transferable access token and substituting the dummy credential for the transferable access token in the authorization request message.

At step S630, the remote server computer 612 can transmit the authorization request message to the authorization computer 614.

At step S632, the authorization computer 614 can determine the interaction value associated with the transferable access token. For example, by searching an access token database to determine a database entry corresponding to the transferable access token, and extracting the interaction value from the database entry.

At step S634, the authorization computer 614 can determine whether the interaction between the resource provider and the second user of the second communication device 604 is authorized. This can be accomplished as described above with reference to FIGS. 3-4. As described above, the authorization computer 614 can evaluate the information presented in the authorization request message and perform risk analysis to determine if the interaction is fraudulent or legitimate. Additionally, the authorization computer 614 can determine whether the transferable access token has enough associated interaction value to complete the interaction. For example, by determining whether the interaction value of the transferable access token exceeds the interaction value of the interaction (e.g., price or cost of transaction).

At step S636, the authorization computer 614 can update the database entry of the transferable access token and generate an authorization response message. For example, for a transferable access token with an interaction value of $100.00 being used for an interaction with value $40.00, the authorization computer 614 can reduce the interaction value of the transferable access token in the access token database from $100.00 to $60.00, the difference between the transferable access tokens interaction value and the interaction value of the interaction. The authorization response message may comprise a status indicator of the interaction (e.g., approved, declined, etc.), an authorization code, the current interaction value of the transferable access token, among other information.

At step S638, the authorization computer 614 can transmit the authorization response message to the remote server computer 612.

At step S640, the remote server computer 612 can transmit the authorization response message to the transport computer 610.

At step S642, the transport computer 610 can transmit the authorization response message to the resource provider computer 608.

At step S644, provided that the interaction is authorized, the resource provider computer 608 can perform any steps to complete the interaction. For an interaction involving access to a secure building, for example, the resource provider computer 608 can transmit an electronic signal to a computerized gate, causing the gate to unlock, allowing the second user to enter the building.

At step S646 the resource provider computer can transmit the authorization response message to the access device 606 such that it can be displayed to the second user.

In some embodiments, there may not be a clearing or settlement process, as the transferable access token has been pre-settled between an issuer and acquirer during the provisioning process, as described above with reference to FIG. 4.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
receiving, by an authorization computer and from an access device, an authorization request message comprising an access token and a first interaction value in a first interaction between a resource provider operating the access device and a first user that uses a portable device, wherein the access token is a substitute for a real credential;
determining, by the authorization computer, that the first interaction is authorized;
generating, by the authorization computer, a first authorization response message;
transmitting, by the authorization computer, the first authorization response message to the access device; and
providing, by the authorization computer, a first transferable access token associated with the first interaction value to a first communication device operated by the first user, wherein the first transferable access token is transferable to a second communication device operated by a second user, and wherein the method further comprises:
receiving, by the authorization computer and from the access device or another access device, a second authorization request message comprising the first transferable access token and a second interaction value in a second interaction between the resource provider operating the access device or the another access device, and the second user that uses the second communication device;
determining, by the authorization computer, the first interaction value associated with the first transferable access token;
determining, by the authorization computer, that the second interaction is authorized;
reducing, by the authorization computer, the first interaction value associated with the first transferable access token by the second interaction value;
generating, by the authorization computer, a second authorization response message; and
transmitting, by the authorization computer, the second authorization response message to the access device or the another access device.

2. The method of claim 1, wherein the portable device is the first communication device.

3. The method of claim 1, wherein providing, by the authorization computer, the first transferable access token to the first communication device comprises:
 searching a database for a communication address for the first communication device using the access token; and
 transmitting the first transferable access token to the first communication device over the air.

4. The method of claim 1, wherein providing, by the authorization computer, the first transferable access token to the first communication device comprises including the first transferable access token in the first authorization response message, wherein the first transferable access token is provided to the first communication device using a communication channel between the first communication device and the access device.

5. The method of claim 1, wherein the first transferable access token comprises a resource provider identifier corresponding to the resource provider, and wherein the first transferable access token can only be used in interactions with the resource provider.

6. The method of claim 1, wherein the first transferable access token is transferable from the first communication device to the second communication device via near field communication.

7. The method of claim 1, further comprising:
 receiving, by the authorization computer, from the first communication device, an access token split message comprising the first transferable access token and a split value, wherein the split value is less than the first interaction value associated with the first transferable access token;
 determining, by the authorization computer, the first interaction value associated with the first transferable access token;
 generating, by the authorization computer, a second transferable access token and a third transferable access token;
 associating, by the authorization computer, the second transferable access token with the split value and the third transferable access token with a difference between the first interaction value and the split value;
 revoking, by the authorization computer, the first transferable access token; and
 transmitting, by the authorization computer, the second transferable access token and the third transferable access token to the first communication device.

8. The method of claim 1, further comprising:
 receiving, by the authorization computer, from the first communication device, an access token combination message comprising the first transferable access token and a fourth transferable access token;
 determining, by the authorization computer, the first interaction value associated with the first transferable access token and an additional interaction value associated with the fourth transferable access token;
 generating, by the authorization computer, a fifth transferable access token, wherein the fifth transferable access token is associated with a combined interaction value equal to a sum of the first interaction value and the additional interaction value;
 revoking, by the authorization computer, the first transferable access token and the fourth transferable access token; and
 transmitting, by the authorization computer, the fifth transferable access token to the first communication device.

9. An authorization computer comprising:
 a processor; and
 a non-transitory computer readable medium coupled to the processor, the non-transitory computer readable medium comprising code executable by the processor for implementing a method comprising:
  receiving from an access device, an authorization request message comprising an access token and a first interaction value in a first interaction between a resource provider operating the access device and a first user that uses a portable device, wherein the access token is a substitute for a real credential;
  determining that the first interaction is authorized;
  generating, by the authorization computer, a first authorization response message;
  transmitting, by the authorization computer, the first authorization response message to the access device; and
  providing, by the authorization computer, a first transferable access token associated with the first interaction value to a first communication device operated by the first user, wherein the first transferable access token is transferable to a second communication device operated by a second user, and wherein the method further comprises:
  receiving, by the authorization computer and from the access device or another access device, a second authorization request message comprising the first transferable access token and a second interaction value in a second interaction between the resource provider operating the access device or the another access device, and the second user that uses the second communication device;
  determining, by the authorization computer, the first interaction value associated with the first transferable access token;
  determining, by the authorization computer, that the second interaction is authorized;
  reducing, by the authorization computer, the first interaction value associated with the first transferable access token by the second interaction value;
  generating, by the authorization computer, a second authorization response message; and
  transmitting, by the authorization computer, the second authorization response message to the access device or the another access device.

10. The authorization computer of claim 9, wherein the portable device is the first communication device.

11. The authorization computer of claim 9, wherein providing the first transferable access token to the first communication device comprises:
 searching a database for a communication address for the first communication device using the access token; and
 transmitting the first transferable access token to the first communication device over the air.

12. The authorization computer of claim 9, wherein providing the first transferable access token to the first communication device comprises including the first transferable access token in the first authorization response message, wherein the first transferable access token is provided to the first communication device using a communication channel between the first communication device and the access device.

13. The authorization computer of claim 9, wherein the first transferable access token comprises a resource provider identifier corresponding to the resource provider, and wherein the first transferable access token can only be used in interactions with the resource provider.

14. The authorization computer of claim 9, wherein the first transferable access token is transferred from the first communication device to the second communication device via near-field communication.

15. The authorization computer of claim 9, wherein the method further comprises:
receiving, from the first communication device, an access token split message comprising the first transferable access token and a split value, wherein the split value is less than the first interaction value associated with the first transferable access token;
determining the first interaction value associated with the first transferable access token;
generating a second transferable access token and a third transferable access token;
associating the second transferable access token with the split value and the third transferable access token with a difference between the first interaction value and the split value;
revoking the first transferable access token; and
transmitting the second transferable access token and the third transferable access token to the first communication device.

16. The authorization computer of claim 9, wherein the method further comprises:
receiving, from the first communication device, an access token combination message comprising the first transferable access token and a fourth transferable access token;
determining the first interaction value associated with the first transferable access token and an additional interaction value associated with the fourth transferable access token;
generating a fifth transferable access token, wherein the fifth transferable access token is associated with a combined interaction value equal to a sum of the first interaction value and the additional interaction value;
revoking the first transferable access token and the fourth transferable access token; and
transmitting the fifth transferable access token to the first communication device.

17. A non-transitory computer readable medium, comprising code, executable by a processor to implement a method comprising:
receiving, by an authorization computer and from an access device, an authorization request message comprising an access token and a first interaction value in a first interaction between a resource provider operating the access device and a first user that uses a portable device, wherein the access token is a substitute for a real credential;
determining, by the authorization computer, that the first interaction is authorized;
generating, by the authorization computer, a first authorization response message;
transmitting, by the authorization computer, the first authorization response message to the access device; and
providing, by the authorization computer, a first transferable access token associated with the first interaction value to a first communication device operated by the first user, wherein the first transferable access token is transferable to a second communication device operated by a second user, and wherein the method further comprises:
receiving, by the authorization computer and from the access device or another access device, a second authorization request message comprising the first transferable access token and a second interaction value in a second interaction between the resource provider operating the access device or the another access device, and the second user that uses the second communication device;
determining, by the authorization computer, the first interaction value associated with the first transferable access token;
determining, by the authorization computer, that the second interaction is authorized;
reducing, by the authorization computer, the first interaction value associated with the first transferable access token by the second interaction value;
generating, by the authorization computer, a second authorization response message; and
transmitting, by the authorization computer, the second authorization response message to the access device or the another access device.

* * * * *